United States Patent
Dyer et al.

(10) Patent No.: US 8,392,561 B1
(45) Date of Patent: Mar. 5, 2013

(54) WIRELESS INTERNET PRODUCT SYSTEM

(75) Inventors: Shane E. Dyer, San Francisco, CA (US); Dustin H. McIntire, Newbury Park, CA (US); Zheng Jiang, Menlo Park, CA (US)

(73) Assignee: Arrayent, Inc., Redwood City, CA (US)

( * ) Notice: Subject to any disclaimer, the term of this patent is extended or adjusted under 35 U.S.C. 154(b) by 646 days.

(21) Appl. No.: 12/489,154

(22) Filed: Jun. 22, 2009

Related U.S. Application Data

(60) Provisional application No. 61/074,484, filed on Jun. 20, 2008.

(51) Int. Cl.
*G06F 15/173* (2006.01)
(52) U.S. Cl. ........ 709/225; 709/229; 455/466; 345/736; 725/105
(58) Field of Classification Search .................. 709/225, 709/229; 455/466; 345/736; 725/105
See application file for complete search history.

(56) References Cited

U.S. PATENT DOCUMENTS

| | | | |
|---|---|---|---|
| 6,687,732 B1* | 2/2004 | Bector et al. | 709/200 |
| 6,832,116 B1* | 12/2004 | Tillgren et al. | 700/1 |
| 2003/0001883 A1* | 1/2003 | Wang | 345/736 |
| 2003/0065791 A1* | 4/2003 | Garg et al. | 709/229 |
| 2006/0161960 A1* | 7/2006 | Benoit | 725/105 |
| 2007/0093991 A1* | 4/2007 | Hoogenboom | 702/188 |
| 2007/0136592 A1* | 6/2007 | Smith | 713/171 |
| 2008/0188250 A1* | 8/2008 | Agarwal et al. | 455/466 |

* cited by examiner

*Primary Examiner* — Thuong Nguyen
(74) *Attorney, Agent, or Firm* — The Mueller Law Office, P.C.

(57) ABSTRACT

Low resource internet devices such as consumer electronics products connect to web service by means of a proxy method where the connected device does not need to maintain the expensive and fragile web service interface itself, but rather uses simple low level protocols to communicate through a gateway that executes software to translate a low level proprietary wireless protocol to a proprietary low level internet protocol that can pass through a firewall to proxy servers that translate the low level protocols thus presenting an interface that makes the internet device appear to have a full web service interface to enable communication between the internet devices and the web server.

21 Claims, 9 Drawing Sheets

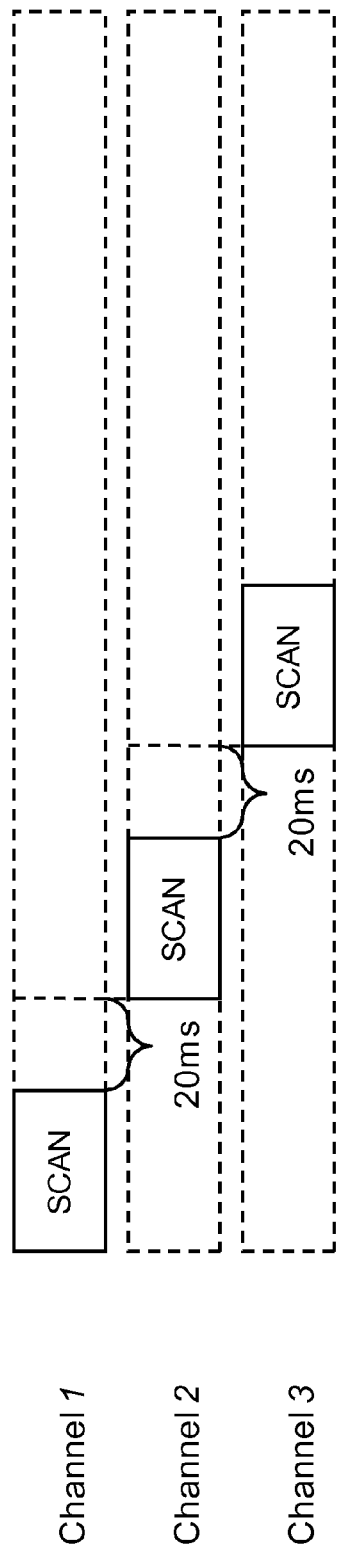
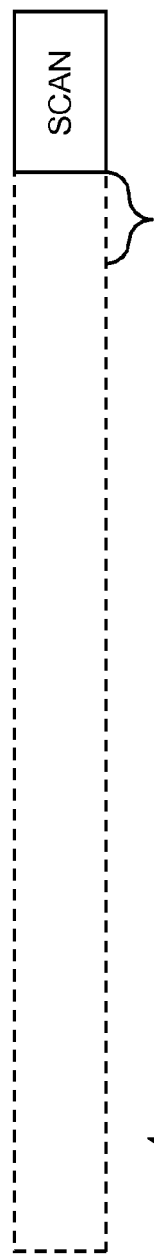
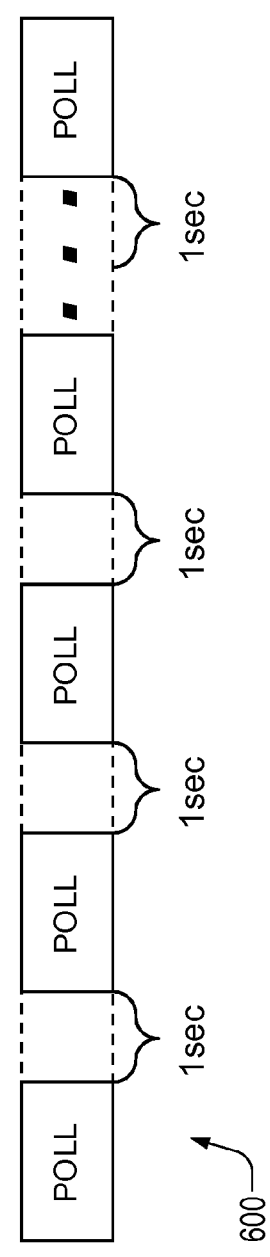
FIG. 5
FIG. 6

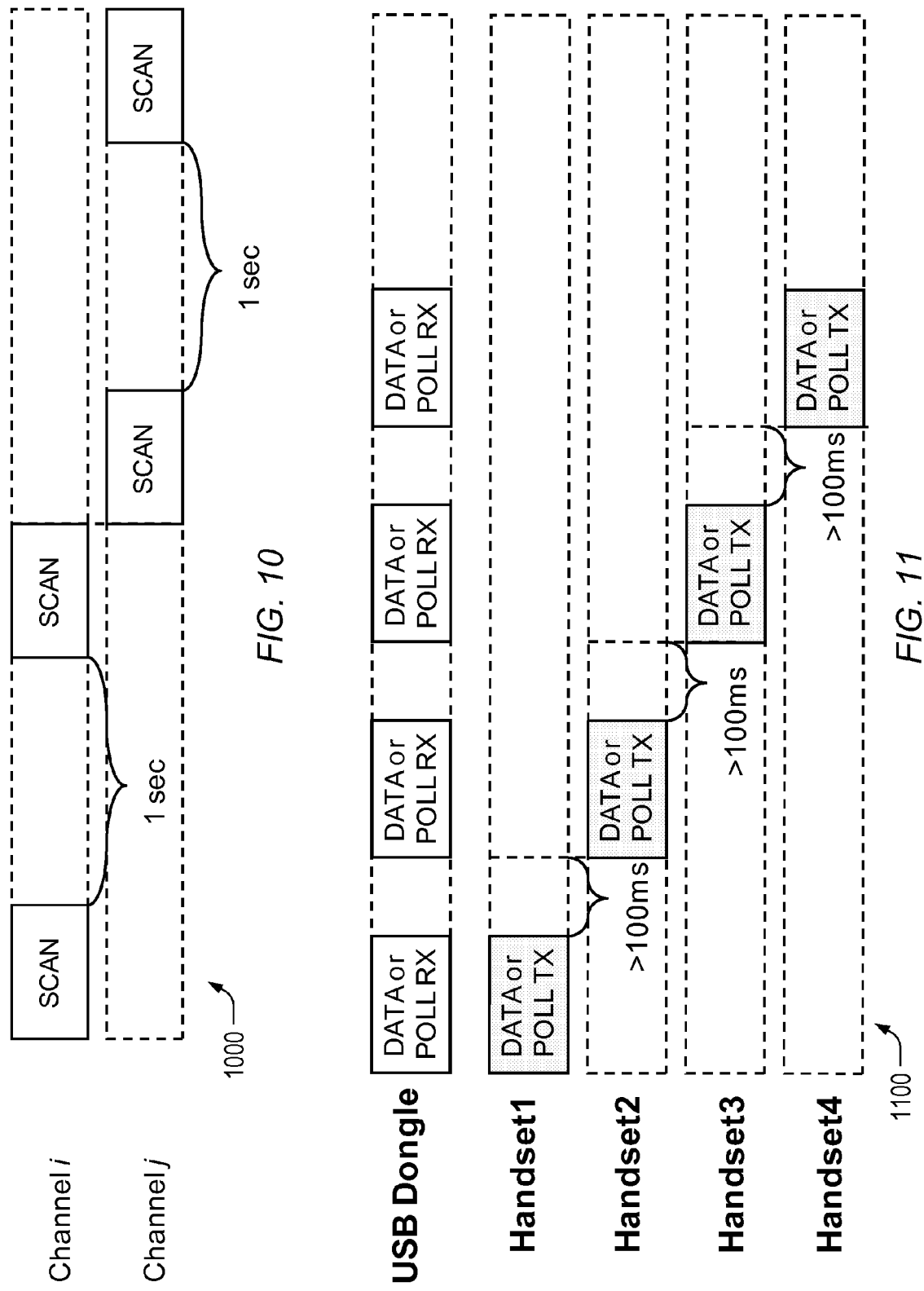

WIRELESS INTERNET PRODUCT SYSTEM

CROSS-REFERENCE TO RELATED APPLICATION

This application claims the benefit under 35 U.S.C. .sctn. 119(e), of provisional application No. 61/074,484; filed Jun. 20, 2008, which is hereby incorporated herein by reference in its entirety and made part of the present U.S. Utility patent application for all purposes.

BACKGROUND

1. Field of the Invention

Invention relates to networked communication systems, particularly to systems enabling simple electronic devices having web service connectivity.

2. Related Art

It is desirable to create a wireless internet system to connect products that can communicate with each other and web applications. The adoption of these systems has been held back by the cost of the devices themselves to support internet protocols because current methods require robust and relatively expensive radio, memory and microprocessor systems as compared to non-networked products. Adoption of internet connected products have also been held back by the cost to support application servers that provide web or internet functionality for the device because the product provider is burdened with back-end infrastructure costs that increase the cost of the product. Inventions that reduce the cost of connected devices while maintaining their internet connected functionality and inventions to improve the efficiency of the back-end infrastructure to support connected products are needed improvements to the current art.

SUMMARY

Electronic devices communicate through firewall connected through proxy and web application servers to internet network. Alternate embodiments of electronic devices use gateway or dongle and personal computer (PC) to connect one or more internet products to firewall. A unique identifier stored in each electronic devices or internet products corresponds to and addresses each electronic devices or internet products throughout system. Program in electronic devices, gateway, or PC transfers unique identifier through firewall by internet message system (IMS) protocol to proxy server software which detects electronic devices. IMS protocol includes unique identifier. IMS packet length is shorter than corresponding web service protocol packet length. Program in proxy server has routing and translating programs which alternatively are in IMS and Translation servers respectively. Routing program routes IMS packet based on stored mapping of unique identifier to internet protocol (IP) address and port to one electronic devices or internet products or, through translating program, to web application server with internet address using web service protocol. This enables internet address using web service protocol to access or communicate information, content, or commands to one electronic devices or internet products or enables one electronic devices or internet products to communicate to other electronic devices or internet products. In an alternate embodiment, application state or key value pair message associated with electronic devices are stored by software in proxy server.

Gateway or dongle communicates to one or more internet products through compact radio protocol (CRP) through low power wireless circuits. CRP packet length is shorter than corresponding IMS packet length. CRP packet using unique identifier has fewer fields than corresponding IMS packet. Software in gateway or PC translates CRP to and from IMS protocol.

Firewall table entry timeout time which blocks IMS transfer from proxy server to electronic devices or internet products is avoided by electronic device or proxy server software which determines approximation short of timeout time and is used to send IMS packet periodically to firewall preventing timeout and permitting communication with reduced system overhead.

In alternative embodiments; gateway or PC stores IMS or CRP packet sent until one or more internet products periodically wake up from low power sleep mode to receive packet to reduce power consumption in internet products, or alternatively, low power wireless circuit determines reduced signal strength condition which initiates resynchronization scan to gateway, or alternatively, firewall is with network address translation.

In alternative embodiments electronic devices or internet products may be; thermostat with ability of storing control setting, animatronic toy with motor causing motion or character gesturing and control circuit with ability to actuate motor, toy with ability to make sound or play sound files and ability to receive sound or sound files from internet address using web service protocol, medical sensor with ability of sending data, and touch screen display drawing pad with ability of sending data. All these abilities are responsive to internet address using web service protocol and touch screen display drawing pad is capable of sending data to another touch screen display drawing pad. Alternative embodiments in combination with above embodiments of animatronic toy use sensor with ability of sending sensor data responsive to motion or environment from toy to internet address web service protocol or to other electronic devices with ability to be responsive to animatronic toy.

Using more compact packet protocols than web service protocols within internet product system enables simpler and cheaper hardware throughout system and resulting operational efficiencies enable many more internet products to be connected than prior art techniques while also reducing cost of server infrastructure. Translating back to web service protocol at web application server also provides standardized web service interface helping application developers bring applications online more efficiently. Using unique identifier addressing enables efficient detection and access of electronic devices or internet products thru firewalls otherwise difficult to achieve using prior art IP based addressing. Embodiments described above enable many internet product connected applications that would otherwise be too expensive using prior art techniques.

BRIEF DESCRIPTION OF DRAWINGS

FIG. 5 is a functional diagram illustrating the procedure of the internet product scanning to find gateways according to an embodiment of the present invention.

FIG. 6 is a functional diagram illustrating the procedure of polling when the internet product is in sleep mode and connected to the gateway according to an embodiment of the present invention.

FIG. 10 is a functional diagram illustrating the procedure of scan frame transmitting when the gateway is powered on and selects a random channel according to an embodiment of the present invention.

FIG. 11 is a functional diagram illustrating the procedure of data and poll frame transmitting during normal gateway operation according to an embodiment of the present invention.

DETAILED DESCRIPTION

Figure 1:
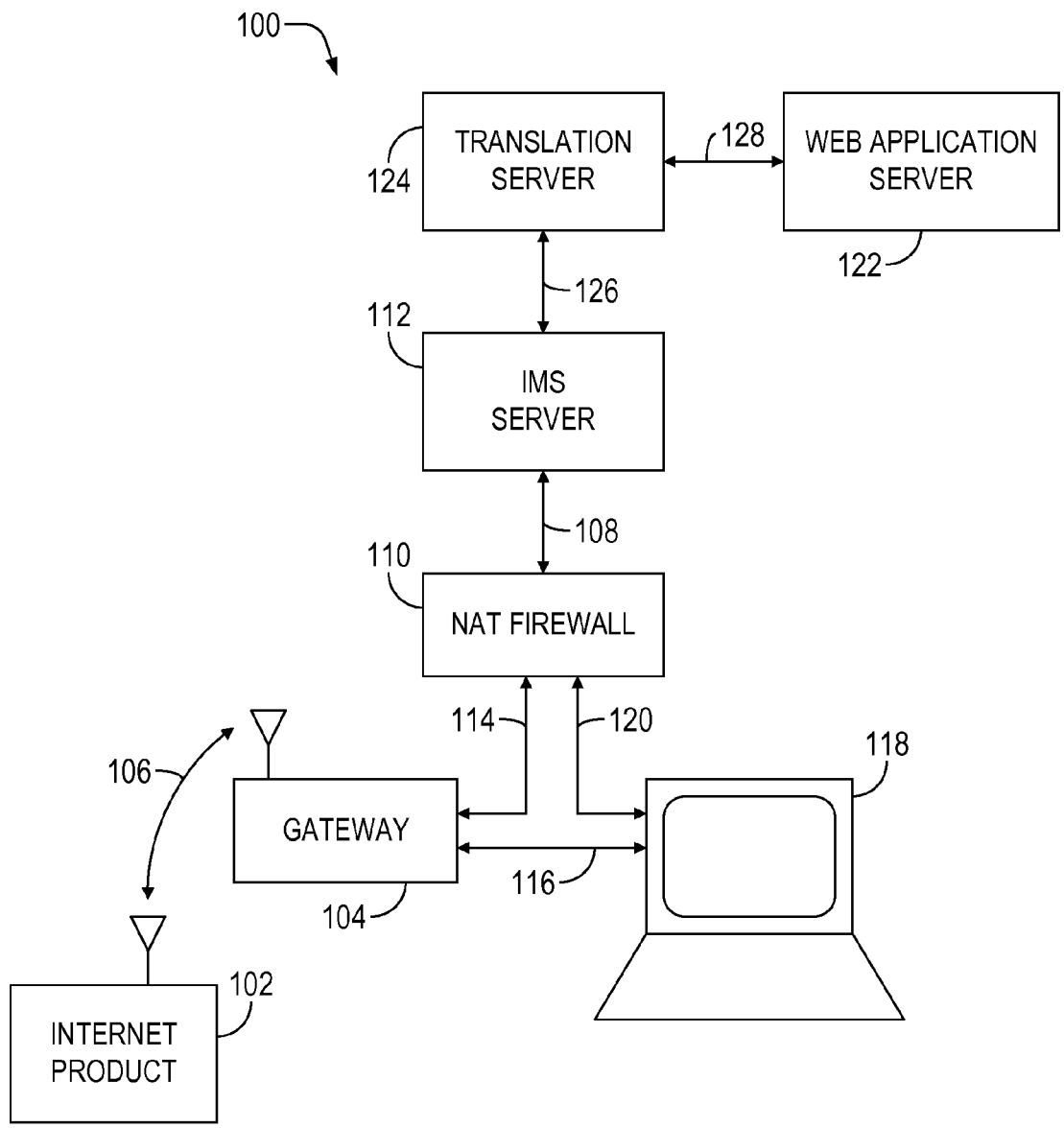
FIG. 1 is a simplified system diagram showing the wireless internet product system according to an embodiment of the present invention.

One embodiment of the invention is an internet product system or sometimes called the wireless internet product system 100 as shown in the simplified system diagram FIG. 1. The system consists of a one or more internet products 102 which are battery or wall powered devices that send and receive information through wireless radios through a one or more gateways 104. "Low-power wireless" or simply "wireless" refers to 802.11a/b/or g/ standard and other proprietary and standard short-range wireless solutions capable of transferring digital data and operating in unlicensed spectrum, for example 433 MHz, 928 MHz, 868 MHz, 2.4 GHz bands and others (examples including WI-FI®, BLUETOOTH®, WI-BREE®, ZIGBEE®, ZWAVE®, and others). The one or more internet products have a low-power radio transceiver and a microcontroller with data storage, for example flash or static random access (SRAM) memory. One or more internet products 102, which may simply be called the internet product, connects to one of one or more gateway 104, which may simply be called the gateway, using a compact radio protocol (CRP) 106. The CRP uses a star topology where one or more internet products communicate with the same gateway.

Gateway 104 also has a low-power radio transceiver and a microcontroller with flash and SRAM memory. The gateway contains software to translate the CRP 106 packets to and from an Internet Message System (IMS) protocol 108, 114, and 120. The IMS packets are sent over internet protocol (IP) through a network address translation (NAT) firewall 110 to an IMS server 112. NAT firewall 110 may simply be called a firewall or NAT but is understood to be any device that blocks unauthorized packets from flowing to the gateway from any servers based on a predetermined rule set or providing the network address translation function.

The gateway exists in one of two configurations. The gateway may connect via a local area network (LAN) connection 114 (such as ETHERNET®) directly to the home or commercial network address translation NAT firewall 110 or router shown in FIG. 1, or it may connect via a universal serial bus (USB) connection 116 to a personal computer (PC) 118, which in turn is connected via local area network connection 120 (such as ETHERNET®) to the home or commercial network NAT Firewall 110 or router. The gateway may have both USB and ETHERNET® interface to allow the user to choose which method to use to give the gateway internet connectivity. In the case of the USB-connected gateway (104, 116, and 118), the translation software runs as a background PC 118 application program that sends and receives compact radio protocol CRP 106 and IMS protocol 120 information. Both the direct ETHERNET®-connected 114 gateway and USB-connected 116 gateway and PC combination will be referred to in this document simply as the "gateway 104 (or 104, 116, and 118)". As described in more detail later, one embodiment of the USB-connected 116 gateway uses a USB dongle (not shown in FIG. 1) in place of gateway 104 where the USB dongle (as 104) contains the wireless radio as described above.

IMS server 112 routes IMS over user datagram protocol (UDP) over IP packets to and from one or more internet products 102 and their destinations. There are two possible destinations. The one or more internet products may communicate with another one of one or more internet products directly, or it may communicate with a web application server 122. An example of the web application server in this case would be a server that provides a web interface that both shows information sent from the one or more internet products and sends information, content or commands to the internet product.

In the case where the internet product is communicating with another internet product directly, IMS server 112 passes the IMS packet to the correct one or more internet products 102 based on a device identifier (ID) found in the IMS packet. The packet is routed directly by the IMS server to the target product's NAT firewall 110 and gateway 104 (or 104, 116, and 118). Note that if an internet product is behind an NAT firewall that does not allow UDP traffic, IMS server 112 can use transmission control protocol (TCP) instead of UDP, although TCP is less efficient.

Many of the one or more internet products are deployed in networks behind NAT firewall 110 devices. These one or more internet products can be reachable from IMS server 112 any time they are in operation so that a message sent from another internet product or initiated from a web application can reach the internet product. However the NAT firewall prevents an outside IP address from contacting an internal IP address unless the contact was initiated by the internal IP address inside the NAT firewall. Those skilled in the art are familiar with a table entry in the NAT firewall that associates an external IP address and port with an internal IP address and port and permits packets to be passed from the external address to the internal address as part of an active communication session. This active communication session will time out on most NAT firewall equipment after a pre-set amount of time. This embodiment of the invention can overcome this NAT firewall restriction by having the internal device send regular, dummy IP packets initiated either from gateway 104 (or 104, 116, and 118) component or from one or more internet products 102 at a frequency higher than the table entry timeout frequency in the NAT firewall. In doing so, the sender ensures that there will always be a valid entry in the NAT firewall table to permit communication from the IMS server to the gateway. When the internet product connects to the IMS server and it was previously disconnected, the new connection to the IMS server will be initiated by the internet product or the gateway in order to be passed by the NAT firewall.

The NAT firewall table connection state may be automatically refreshed by gateway 104 (or 104, 116, and 118) upon any data packet transmission between one or more internet products 102 and gateway 104 (or 104, 116, and 118) (described below). Alternatively, the internet product may refresh state via a scanning operation (also described below). This refresh operation may be performed at any energy-efficient time selected by the internet product, and is typically coordinated with other device operations to minimize power state transition energy.

In the case where one or more internet products 102 are communicating with web application server 122, IMS server 112 passes the IMS packet to the web application server through a translation server 124. The translation server translates IMS over IP 126 to and from a standard web service protocol 128 such as extensible markup language (XML) over hypertext transfer protocol (HTTP) by providing a web service application programming interface (API) to web application server 122. This translation allows standard web application servers to communicate seamlessly with the entire internet product system using a standard web service protocol. "Web service" refers to machine-to-machine communications using XML over HTTP. Translation server 124 can also provide a generic way to store the states of the various one or more internet products 102 so the state of the product can be retrieved from the translation server rather than the internet product to increase efficiency.

Translation server 124 advantages over the prior art are now described. By translating a standard web service protocol 128 to IMS over IP 126, translation server 124 both provides a standard web service API to web application server 122 and also communicates with IMS server 112 using the more efficient IMS packet structure. This topology has several benefits. First, the XML format for the web service interface, although standard for web application servers, is much less efficient than IMS over IP. Translating packets as soon as they are received by the translation server to the more compact IMS format 108, 114, 120, and 126 saves processor, memory, and bandwidth resources throughout the system as compared to passing data in XML format to other servers and/or down to one or more internet products 102. Secondly, by using the IMS packet format to communicate from the translation server to the IMS server, the IMS server can be simpler and therefore more efficient than a standard server such as a web server, since communication on both sides of IMS server 112 uses the same high-efficiency IMS over IP 126 and 108 protocol.

In addition, translation server 124 defines a standard interface to access internet-connected products in both representational state transfer (REST), simple object access protocol (SOAP) or other web service formats and provides a generic way to store the states of one or more internet products 102. Internet product state storage can be implemented at the translation server in two ways. First, one or more internet products 102 can send an application state to translation server 124 for storage and web application server 122 can retrieve each named property from the translation server. In this method the translation server acts as a cache for the internet product. The second more generic way to implement storage at translation server 124 is to have the translation server store a list of key value pair messages sent from one or more internet products 102 to the web application. Web application server 122 can then retrieve all the stored key value pair messages on translation server 124 or choose to retrieve only a subset of the messages based on their key. It will dramatically reduce the cost of development of the related web applications because a designer needs to understand only the web service API for communicating with one or more internet products 102 and not any of the details of the IMS or CRP protocols that they use to communicate.

CRP 106 advantages over the prior art are now described. Small data sizes are common for one or more internet products 102 on low-power wireless networks to facilitate less capable and therefore less expensive radio and packet processing hardware. The overhead of UDP or TCP normally imposed by an IP-based protocol is not needed by hardware of this type and creates and unnecessary inefficiency. The CRP 106 uses fewer fields and smaller headers than UDP/IP or TCP/IP, and the maximum packet length for CRP 106 is shorter than that of UDP or TCP. As a result, the CRP leads to higher efficiency in transferring user payload data for hardware that does not require a higher-level protocol. For low-power wireless networks, this added efficiency is an advantage.

IMS protocol advantages over the prior art are now described. One of the features of IMS protocol 108, 114, 120, and 126 is that it is close to a direct mapping of CRP 106 to a simple format that can be sent over an IP network. The IMS protocol follows the size restrictions and formats of the CRP even though UDP or TCP would ordinarily not need to follow such restrictions. Limiting use of UDP or TCP packets to the subset IMS protocol goes against the current teaching in the art, as the packets are smaller than would be optimal for operation on an IP-only network. However the use of IMS protocol 108, 114, 120, and 126, while not optimal for an IP-only network, makes the translation by gateway 104 (or 104, 116, and 118) to and from a CRP 106 packet in an IMS-based network, much simpler. For example, the IMS protocol restricts packet size such that there are no packets that are too large to be supported by the CRP. It thereby ensures that no packets need be broken up into smaller packets when translated by the gateway to the low-power radio network, reducing the complexity and therefore the cost of the gateway.

Keeping the IMS packet structure close to the CRP packet structure also has the benefit of making it easier to have compatibility between the Ethernet-connected 114 gateways and gateways that connect to a PC via a serial connection such as USB connection 116, since the complexity of the gateway translations are greatly simplified. A less complex gateway is easier and less expensive to implement on limited embedded hardware.

A key feature of IMS protocol 108, 114, 120, and 126 is the use of a connectionless protocol such as UDP for a majority of communications between one or more internet products 102 and IMS server 112. For a traditional server such as Web Server, both the TCP connection overhead and the need to retain state for typical communication transactions consumes memory and processor resources on the server reducing the number of internet products that can be connected to the server simultaneously. Using the connectionless protocols in conjunction with the design of transactions using the IMS protocol, allows the minimum state for common transactions to be stored on the IMS server. Storing little state and using connectionless protocols such as UDP allows IMS server 112 to process transactions for many more internet products than can be processed by server architectures currently used in the art that rely on connection-oriented protocols such as TCP. Using TCP would consume more system resources such as threads, file descriptors, etc. For a traditional server such as web server, both the TCP connection overhead and the need to retain state for common transactions consume memory and processor resources on the server reducing the number of internet products that can be connected to the server simultaneously. Correspondingly, the IMS server may be designed with low-cost hardware, using comparatively little bandwidth, while serving many internet products simultaneously.

To improve the availability and balance the traffic load, IMS server 112 is designed and implemented as a cluster server using distributed memory cache technologies. Considering the tradeoff between performance and guaranteed data replication, and also considering the cost-sensitive nature of the consumer electronics market, the data replication among the multiple cluster nodes is designed in a best effort fashion. Occasional out-of-synchronization of data among the server nodes in the cluster due to network failure can be resolved by automatic audit and resynchronization, or by a restart of one or more server nodes. The databases used as a component of the IMS server, which contain the description of internet-connected products, are also entirely replicated to multiple server nodes in the cluster. This eliminates the need for the database replication server and expensive storage hardware and at same time achieves good results in terms of data recovery.

To further simplify the recovery process, each main description data entry of one or more internet products 102 is assigned to one primary server node. The database record in its primary server node will be the master record of that entry. IMS server 112 routes all the update requests of the main description entries to their primary server node so that the master record is always updated first and then replicated to other server nodes in the cluster. All databases in the cluster will be recovered automatically based on their master records when system restarts by using above technique. The databases can also be recovered easily with minimum manual intervention in major disk failure. It can dramatically reduce the data recovery cost and time.

More efficient protocols save cost. Prior internet-connected products, including some that have used web service directly on the internet product, have used HTTP to communicate to send and receive data between devices and internet servers. This invention embodiment uses web service protocol 128 to connect to web application server 122, but translates the connections to more efficient UDP IMS protocols 108, 114, 120, and 126 for other communication points within the architecture. This has the benefit of providing standard web application server interfaces while eliminating the overhead that would be incurred if complicated http and xml protocols were used with one or more internet products 102 and core IMS server 112. The overhead of HTTP and XML protocols would normally make one or more internet products 102 more expensive because they would need full TCP and HTTP and XML capability, requiring more SRAM, flash memory, and a higher performance processor. This invention embodiment allows one or more internet products 102 to be less expensive. The server infrastructure to support one or more internet products that used TCP UDP XML and or Web service would also be more expensive than this embodiment of the invention as more data would need to be passed between the internet product and the server. Additionally the server would need to maintain more state on each connected product, requiring more memory and processing resources on the server, and thus reducing the number of internet products each server could support.

The following embodiment provides additional enhancements. Periodic NAT firewall table refresh operations by one or more internet products 102 or gateway 104 (or 104, 116, and 118) introduce a certain amount of communication overhead. Often, for a battery-powered internet product, packets sent down to the internet product will be stored in the gateway, and the internet product will periodically wake up from a low power sleep mode to query the gateway to see if there are any such packets that the gateway needs to transmit to the internet product. In one embodiment, this periodic data can double as a NAT firewall refresh request, triggering a dummy IP packet to be sent from gateway 104 (or 104, 116, and 118) to IMS server 112. This double use of a data query packet from one or more internet products 102 to the gateway to trigger the dummy IP packet to be sent from the gateway to the IMS server is more efficient than handling the two functions separately. In addition, this technique makes the design of the gateway component simpler as it no longer needs to keep track of the state of one or more internet products that are active on the wireless network and must therefore maintain regular dummy packet traffic to the IMS server to ensure the internet product is reachable by the IMS server. The timers for determining when a dummy packet needs to be sent are in one or more internet products 102 and not in gateway 104 (or 104, 116, and 118) so the gateway design can be simpler and therefore less expensive. A dummy IP packet or any other IMS packet is sent through NAT Firewall 110 to IMS server 112 to make sure the state in the NAT Firewall reflects that there is an active connection between the IMS server and the internet product such that IP packets from the IMS server sent to the internet product are not blocked by the NAT firewall because there is no current state in the NAT firewall associating and therefore permitting the IMS IP address to send IP packets to the internal IP address of the internet product's gateway.

A second enhancement is as follows. In one embodiment of the invention, IMS server 112, gateway 104 (or 104, 116, and 118), or one or more internet products 102 requests a succession of dummy packets to be sent from the gateway to the IMS server and, over time, increase the send period between dummy packets. The IMS server will then attempt to communicate with the gateway or internet product at increasingly longer periods of time after the send time of the last dummy packet. Eventually when the IMS server sends an IP packet it does not receive a response from the gateway or internet product because the IP packet was blocked due to the timeout of the table entry in NAT firewall 110 permitting the traffic from the IMS server to the gateway. By recording the longest delay from dummy packet to a successfully transmitted packet from the IMS server to the gateway, the timeout period for the NAT firewall can be approximated, and a value determined for the maximum period between dummy packets to maintain the NAT firewall table state. To ensure more dependable or higher accuracy results this NAT firewall timeout test can be repeated. By gauging the approximate timeout period, the slowest and therefore most bandwidth efficient refresh rate can be selected for refresh requests on the wireless network. This NAT firewall timeout test can be initiated and or directed from either IMS server 112, gateway 104 (or 104, 116, and 118) or one or more internet products 102.

Another embodiment is now described. Since the one or more internet products 102 are often powered by low-cost battery sources, a design consideration is the reduction of the internet product's network power consumption. Gateway 104 (or 104, 116, and 118), in contrast, is assumed to be powered by external supply and may therefore operate with reduced consideration to power consumption. This necessitates a network protocol in which the internet product has minimal transmission overhead, while the gateway may operate in a less energy optimally fashion in order minimize internet product energy requirements.

In the embodied radio and network protocol, the internet products operate in a decoupled fashion whereby one or more internet products 102 do not maintain connection or synchronization information for other internet products, including those currently associated with the same gateway. Rather, the connection state is maintained solely in the gateway. The internet product is only periodically required to refresh connection state within a predefined period of time in order to maintain a current NAT firewall 110 table entry within the gateway.

One embodiment of the invention is providing low-latency, highly energy efficient delivery of data packets. This is done through an energy-efficient radio and network protocol design (CRP) and efficient caching of data packets at a gateway's radio. Caching is provided via queuing data packets in gateway 104 (or 104, 116, and 118) which are destined for any currently associated one or more internet products 102 currently associated with that gateway. This reduces network power consumption by eliminating the requirement to relay data requests to IMS server 112. In the gateway, data packets are presorted chronologically and by internet product identifier in order to optimize packet lookup time. Data is transferred only when requested by one or more internet products 102 via a poll request (described in following sections). This reduces network power consumption of the internet product by eliminating the requirement to relay each data request separately to the IMS server. In the gateway, data packets are presorted chronologically and by internet product identifier in order to optimize packet lookup time. The internet product may optimally coordinate data transfer with other activities as well as optionally batch data transfers in order to minimize power state transition overhead.

Since the one or more internet products 102 are often powered by low cost battery sources, a paramount design consideration is the reduction in the internet product's network power consumption. Gateway 104 (or 104, 116, and 118) in contrast is assumed to be powered by external supply and may therefore operate with reduced consideration to power consumption. This necessitates a network protocol in which the internet product has minimal transmission overhead, while the gateway may operate in a less energy optimally fashion in order minimize internet product energy requirements. In the embodied radio and network protocol, the internet products operate in a decoupled fashion whereby one or more internet products 102 do not maintain connection or synchronization information for other internet products, including those currently associated with the same gateway. Rather, the connection state is maintained solely in the gateway. The internet product is only periodically required to refresh connection state within a predefined period of time in order to maintain connection state within the gateway. The connection state is automatically refreshed by the gateway upon any data packet transmission between the internet product and gateway. Alternatively, the internet product may refresh state via a scanning operation (described below). This refresh operation may be performed at any energy efficient time selected by the internet product, and is typically coordinated with other operations to minimize power state transition energy.

An additional embodiment in the invention of the internet product and gateway is the ability of one or more internet products 102 to resynchronize with one or more gateways 104 (or 104, 116, and 118) to provide a roaming capability. The internet product may initiate a scan for additional gateways existing in the environment either periodically, or when a reduced received signal strength from the currently associated gateway is detected. When the scan procedure locates a gateway with adequate signal strength, as described by the scanning process in following sections, the internet product will associate with the new gateway by initiating a login process with IMS server 112. This indicates to the IMS server that the internet product has roamed to a new gateway and that all future transactions should be routed to this gateway. The internet product, also called a "handset" in these descriptions, remains associated with the former gateway until the IMS server login has successfully completed. The process creates a novel capability for one or more internet products to have mobility through a continuous re-association process with both gateways and the IMS server connections.

Another embodiment of the invention is an automatic channel selection scheme initiated by gateway 104 (or 104, 116, and 118) upon power-on or when the active channel noise floor reaches a threshold indicating radio interference from unknown noise sources. The gateway, whose receiver is continuously monitoring the selected communications channel frequency, will monitor the current channel transmission quality. Channel quality is determined both by the presence of undesirable noise as well as occupancy by other gateways.

Measurement of undesirable noise is performed by enabling the receiver and periodically sampling the receiver's low noise amplifier receive signal strength indicator. This signal is proportional to the amount of power detected in the radio channel at the selected frequency band. The periodic sampling records both the average and peak values over a specified sampling period. If either peak or average values are measured to be above predefined constants (this detects both ambient noise and burst transmission interference), then the channel is removed from the candidate channel list.

To detect occupancy gateway 104 (or 104, 116, and 118) both actively and passively solicits the presence of other gateways on the candidate frequency channel. In this mode, the gateway requests a reply from any nearby gateways on the same frequency channel. The gateway then receives responses any from responding gateways. At the same time, the channel is passively monitored for transmissions between any nearby one or more internet products 102 and gateways. During the listening period, the total number of bytes in all received packets is summed. This value is used to estimate the channel occupancy ratio. If this occupancy ratio exceeds a threshold value, the channel is considered occupied and removed from the candidate list. Once all channels have been scanned for noise and occupancy and the undesirable channels removed from the candidate list as described above, gateway 104 (or 104, 116, and 118) selects the active frequency channel through a uniformly random selection from the candidate list.

Figure 2:
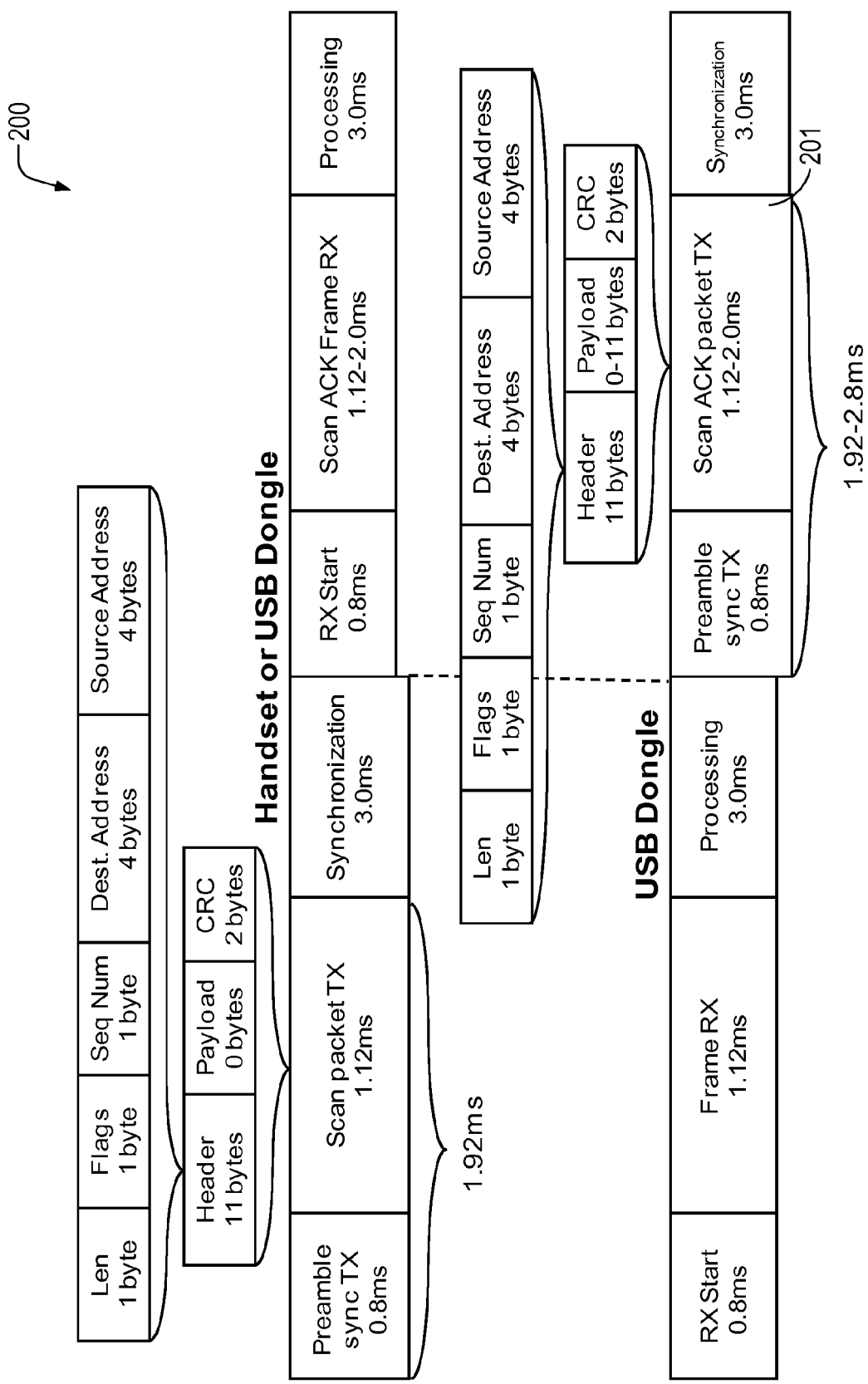
FIG. 2 is a functional diagram illustrating the scan frame according to an embodiment of the present invention.

The internet product to gateway CRP 106 is described in the following sections. FIG. 2 is a functional diagram illustrating the scan 200 frame used as an internet product scan for gateways according to an embodiment of the present invention. Scan 200 is sent once one each hopping channel at initial system synchronization to locate gateways. Scan 200 has a maximum transmit time for initiating one or more internet products 102 or gateway 104 (or 104, 116, and 118) of 1.92 ms or for the gateway of 2.8 ms. The scanning frame is shown for use with either handset or USB dongle. Scan 200 frame includes Scan ACK packet TX 201 which includes an 11 byte header field, a 0-11 byte payload field, and a 2 byte cyclic redundancy check (CRC) field. The header includes a destination address field of 4 bytes, a 4 byte source address field, a 1 byte length field, a 1 byte flags field, and a 1 byte sequence number field.

Figure 3:
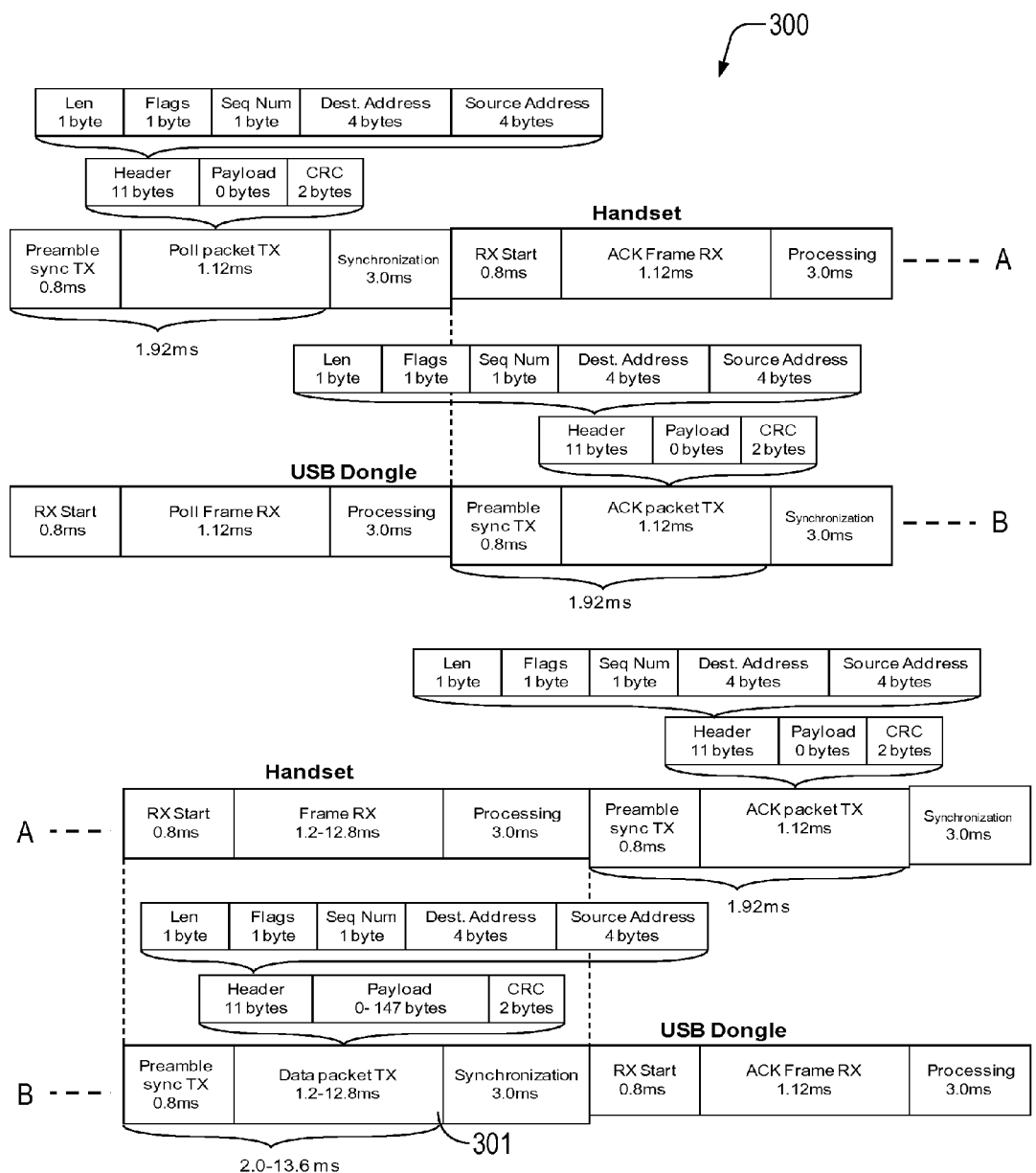
FIG. 3 is a functional diagram illustrating the poll frame according to an embodiment of the present invention.

FIG. 3 is a functional diagram illustrating the poll 300 frame used for gateway 104 (or 104, 116, and 118) to one or more internet product 102 data transfers according to an embodiment of the present invention. Poll 300 has a polling frequency of 1 Hz, and has a maximum transmit time for gateway 104 (or 104, 116, and 118) of 15.52 ms or for the one or more internet products 102 of 3.84 ms. The polling frame is shown for use with either handset or USB dongle. Poll 300 frame includes Data packet TX 301 which includes an 11 byte header field, a 0-147 byte payload field, and a 2 byte cyclic redundancy check (CRC) field. The header includes a destination address field of 4 bytes, a 4 byte source address field, a 1 byte length field, a 1 byte flags field, and a 1 byte sequence number field.

Figure 4:
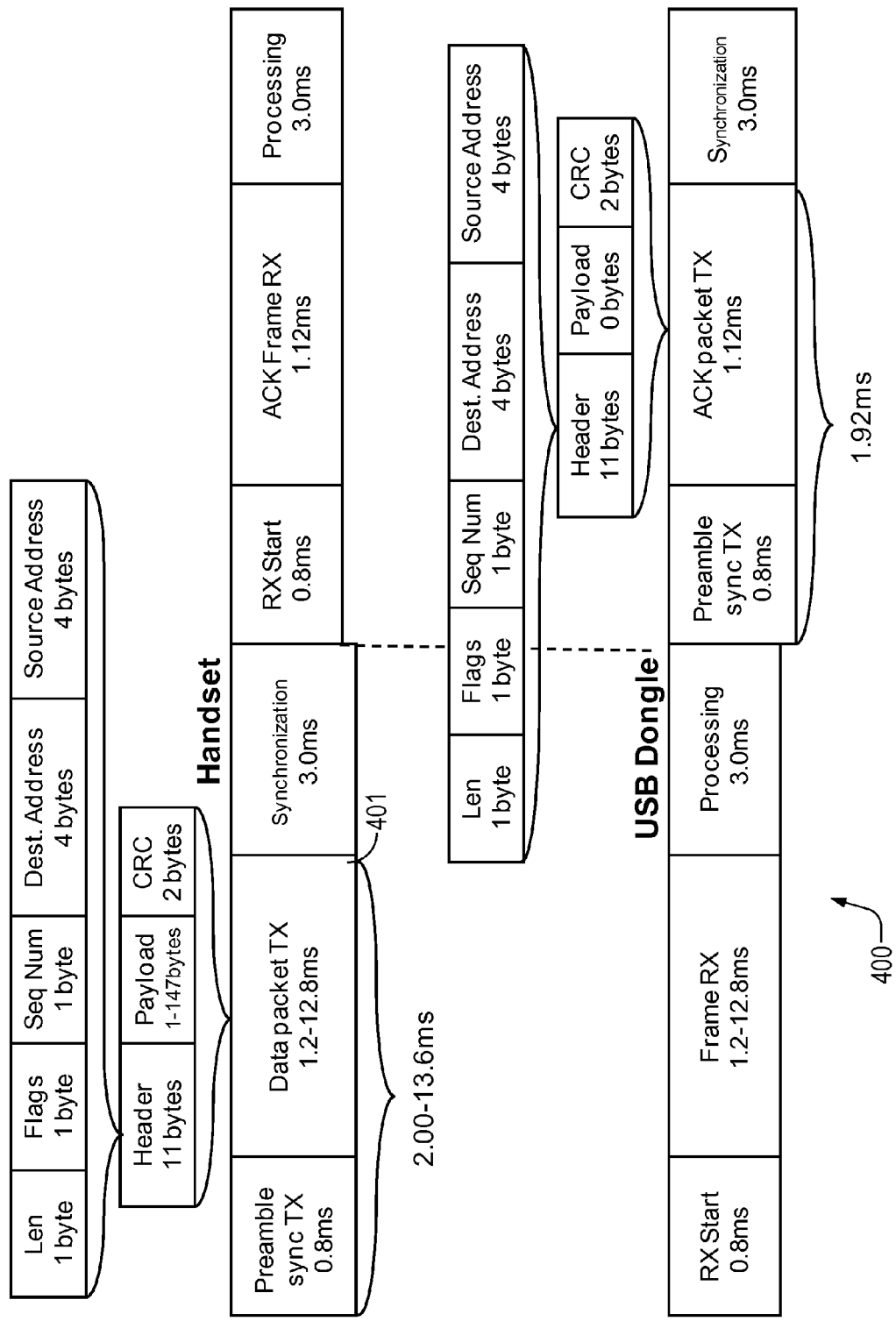
FIG. 4 is a functional diagram illustrating the data frame according to an embodiment of the present invention.

FIG. 4 is a functional diagram illustrating the data 400 frame used for one or more internet products 102 to gateway 104 (or 104, 116, and 118) data transfers according to an embodiment of the present invention. Data 400 has no maximum transmit frequency, has a maximum of 2 retries with exponential back off, and has a maximum frame transmit time for one or more internet products 102 of 13.6 ms or for gateway 104 (or 104, 116, and 118) of 1.92 ms. The data frame is shown for use with either handset or USB dongle. Data 400 includes Data packet TX 401 which includes an 11 byte header field, a 1-147 byte payload field, and a 2 byte cyclic redundancy check (CRC) field. The header includes a destination address field of 4 bytes, a 4 byte source address field, a 1 byte length field, a 1 byte flags field, and a 1 byte sequence number field.

An embodiment for multiple data transfers to and from a single gateway 104 (or 104, 116, and 118) by one of one or more internet products 102 is described next. Each one or more internet products 102 is limited to one data 400 or poll 300 frame transfer attempt per 100 ms. Likewise the gateway will not respond to more than one data or poll request within any 100 ms time frame. Since each internet product may be actively associated with only one gateway, it will not send more than one data or poll frame in any 100 ms time interval. Since the gateway may be connected to up to 4 internet products, which are not time synchronized, the gateway will delay responding to any data or poll packets that arrive within 100 ms of any previous data or poll packet. This is required to achieve Federal Communications Commission (FCC) mandated activity duty cycling.

For one or more internet products 102 initiated data 400 frames, the delay is guaranteed by the carrier sense multiple access (CSMA) exponential back-off algorithm, $$T_{backoff} = 100 + \text{rand}[0\text{-}15] << \text{retry\#} \text{ ms}.$$

For any successful data 400 or poll 300 frame transfer, there is a 100 ms delay on the transmitter lock to prevent any additional frames from being transmitted.

FIG. 5 is a functional diagram illustrating the procedure 500 of one or more internet products 102 scanning to find one or more gateways 104 (or 104, 116, and 118) using 16 available channels as an example according to an embodiment of the present invention. The internet product performs a scan for all gateways after user login and when the user selects 'Reconnect' from the menu options. This can also automatically be performed upon loss of connection or when receive signal strength indicates poor connectivity to the currently associated gateway. The scan for gateways is performed by sending scan frames sequentially on each available channel.

The scan 200 frames are separated by a 20 ms back-off period. The maximum total transmit time from any internet product in a 100 ms period would be, $$\text{ceil}(100/(20+1.92)) * 1.92 \text{ ms} = 9.6 \text{ ms}.$$

FIG. 6 is a functional diagram illustrating the procedure 600 of polling when one of the one or more internet products 102 is in sleep mode and connected to gateway 104 (or 104, 116, and 118) whereby the internet product will send a single poll 300 frame once per second according to an embodiment of the present invention. Poll 300 frames are sent to the associated gateway. There are no retries for any lost subframe elements in the poll frame. Lost data will be resent in the following poll frame occurring 1 second later. The maximum transmission time for any internet product in sleep mode during a 100 ms interval will be a single poll frame (3.84 ms).

Figure 7:
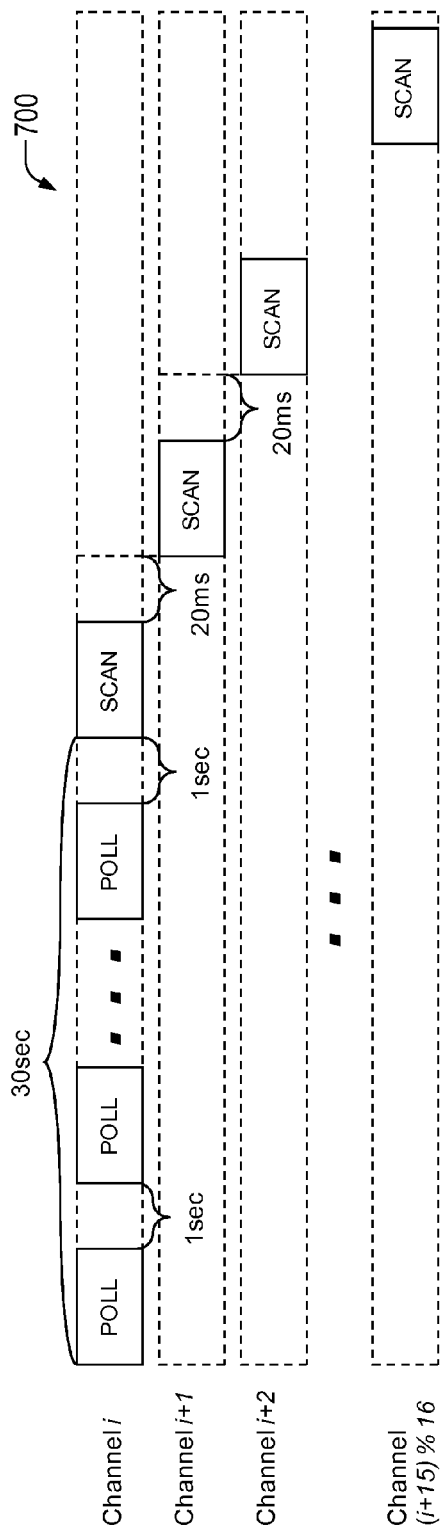
FIG. 7 is a functional diagram illustrating the procedure of polling and scanning when the internet product is in sleep mode and not connected to the gateway according to an embodiment of the present invention.

FIG. 7 is a functional diagram illustrating the procedure 700 of polling and scanning when the internet product is in sleep mode and not connected to the gateway according to an embodiment of the present invention. When one or more internet products 102 is in sleep mode and not connected to gateway 104 (or 104, 116, and 118) or if the connection to the associated gateway is lost during sleep, the internet product will perform a new gateway scan 300 (see procedure 500 embodiment of internet product scan for gateways above) once every 30 seconds instead of performing the normal poll 300 frame transmission. The internet product maximum transmission time in any 100 ms interval will be the maximum of the poll frame transmission and the scan for gateways given by, $$\text{MAX}(3.84, 9.6) = 9.6 \text{ ms}.$$

Figure 8:
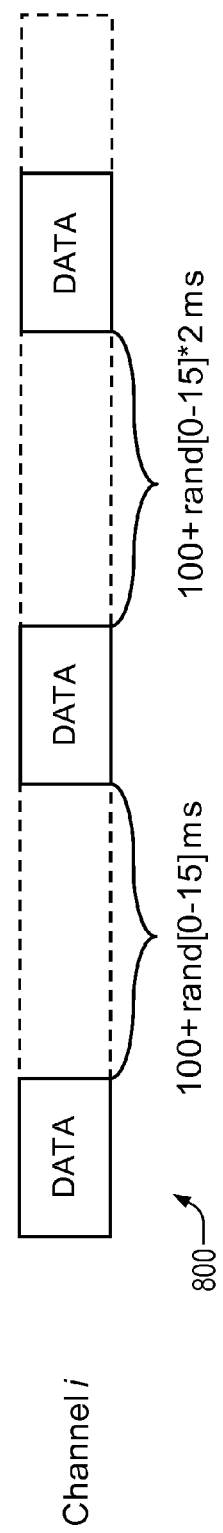
FIG. 8 is a functional diagram illustrating the procedure of data frame transmitting with retries during normal operation according to an embodiment of the present invention.
Figure 9:
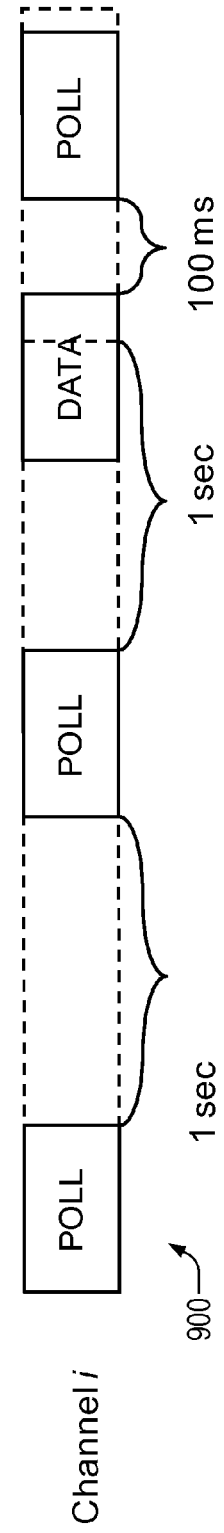
FIG. 9 is a functional diagram illustrating the procedure of poll and data frame transmitting when the poll frame is held during normal operation according to an embodiment of the present invention.

In one embodiment for the internet product in normal operation there are both poll 300 frames transmitted once per second as well as data 400 frames transmitted only when the internet product user initiates some action through a key press. The two frame types are asynchronous to one another with the restriction that only one data or poll frame may be sent in any 100 ms time interval. FIG. 8 is a functional diagram illustrating the procedure of data 400 frame transmitting with retries 800 during normal operation according to an embodiment of the present invention. The retry interval is given by the previously defined exponential random back-off calculation. FIG. 9 is a functional diagram illustrating the procedure 900 of poll 300 and data 400 frame transmitting when the poll frame is held during normal operation according to an embodiment of the present invention. When a data frame occurs within 100 ms of a scheduled poll frame transmission time, the poll frame is held until the 100 ms delay occurs. The maximum transmission time in any 100 ms interval will be the maximum of a single poll or data frame given by, $$\text{MAX}(3.84, 13.6) = 13.6 \text{ ms}.$$

FIG. 10 is a functional diagram illustrating the procedure 1000 of scan 200 frame transmitting when the gateway is powered on and selects a random channel according to an embodiment of the present invention. When gateway 104 (or 104, 116, and 118) is powered on, it selects a random channel i (where i is in the range 1 to 16 in this example). The gateway then sends a single scan 200 frame to test for existing gateways on the current channel. Gateway then receives for 1 second to determine if the received signal strength indication (RSSI) reading indicates too much noise on the channel, which indicates potential interference from other radiators. If no interference is found, the gateway will send an additional scan frame to probe for existing gateways. If no other gateways are found, the gateway proceeds to the operational mode. If the channel is occupied by another gateway, or if there is interference from other radiators on the current channel i, the internet product will select a new random channel j between 1 and 16 and repeat the described channel probing process. The maximum transmit time for a gateway during any 100 ms interval during startup will be a single scan frame (1.92 ms).

FIG. 11 is a functional diagram illustrating the procedure 1100 of data 400 and poll 300 frame transmitting during normal gateway 104 (or 104, 116, and 118) operation according to an embodiment of the present invention. In this embodiment, the gateway has no sleep or standby modes as detailed for the internet product. Likewise the gateway does not initiate transmissions to any handset other than in the gateway's power on stage described above. Transmission time is limited at the gateway by servicing only a single data 400 or poll 300 frame in any 100 ms interval. If a data or poll frame arrives from another internet product within 100 ms of servicing any current poll frame, the response is delayed until the 100 ms wait has transpired. The maximum transmission time in any 100 ms interval will be the maximum of a single data or poll frame given by, MAX(1.92,13.6)=13.6 ms.

Figure 12:
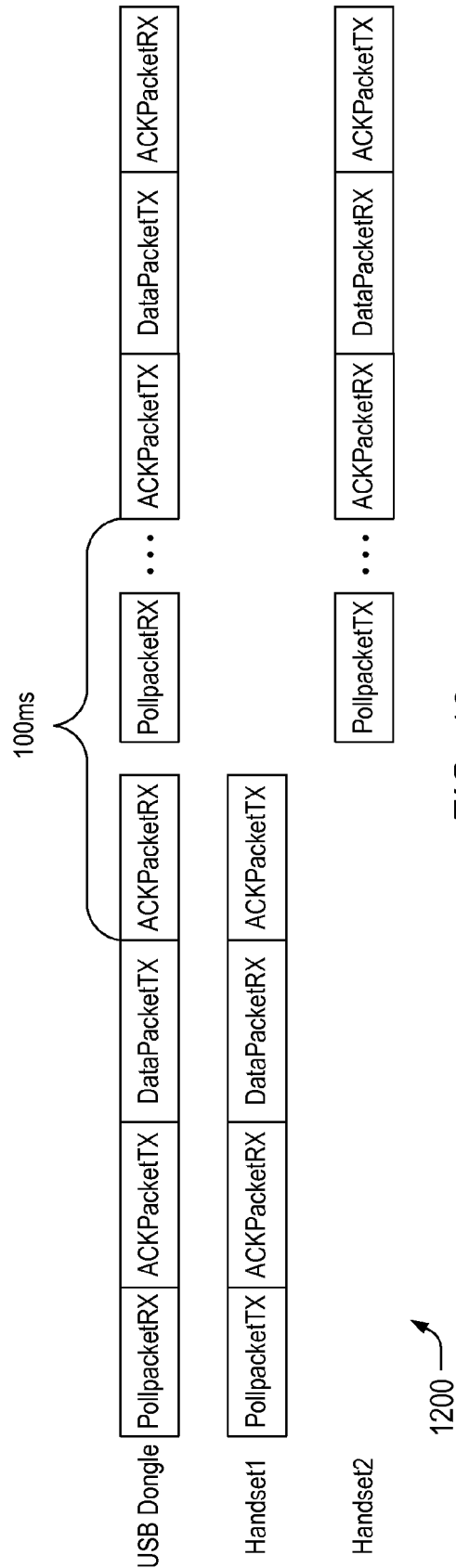
FIG. 12 is a functional diagram illustrating the procedure of data and poll frame transmitting when a second internet product poll is delayed by a first internet product poll frame during normal gateway operation according to an embodiment of the present invention.

FIG. 12 is a functional diagram illustrating the procedure 1200 of data 400 and poll 300 frame transmitting when a second internet product poll 300 is delayed by a first internet product poll 300 frame during normal gateway operation according to an embodiment of the present invention. If any poll or data 400 frame arrives at the gateway within 100 ms of the previous poll or data frame, the gateway will delay the ACK response packet until the 100 ms delay has occurred.

Figure 13:
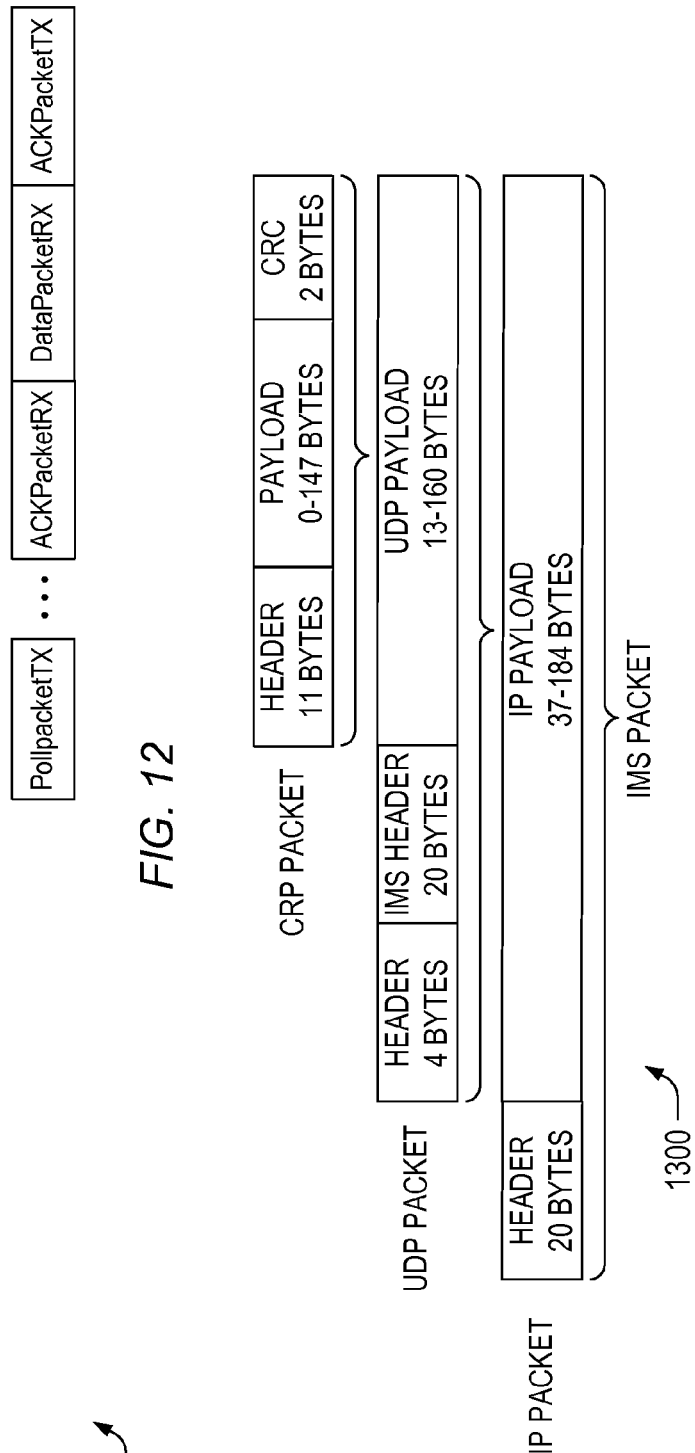
FIG. 13 is a functional diagram illustrating the IMS on UDP on IP packet according to an embodiment of the present invention.

FIG. 13 is a functional diagram illustrating the previously described IMS on UDP on IP packet 108, 114, 120, or 126 structures according to an embodiment 1300 of the present invention. The previously described CRP 106 packet (13-160 bytes) is loaded on a UDP packet as a UDP payload. The UDP packet further has a 4 byte UDP header and may have an added 20 byte IMS header. The UDP packet is then loaded as an IP packet payload. The IP packet also has a 20 byte header. The total IMS packet is then 57-204 bytes long and substantially smaller than the maximum standard web service UDP packet length of 65,507 bytes. The practical limit for other embodiments of an IMS packet length is estimated to be less than 500 bytes.

Figure 14:
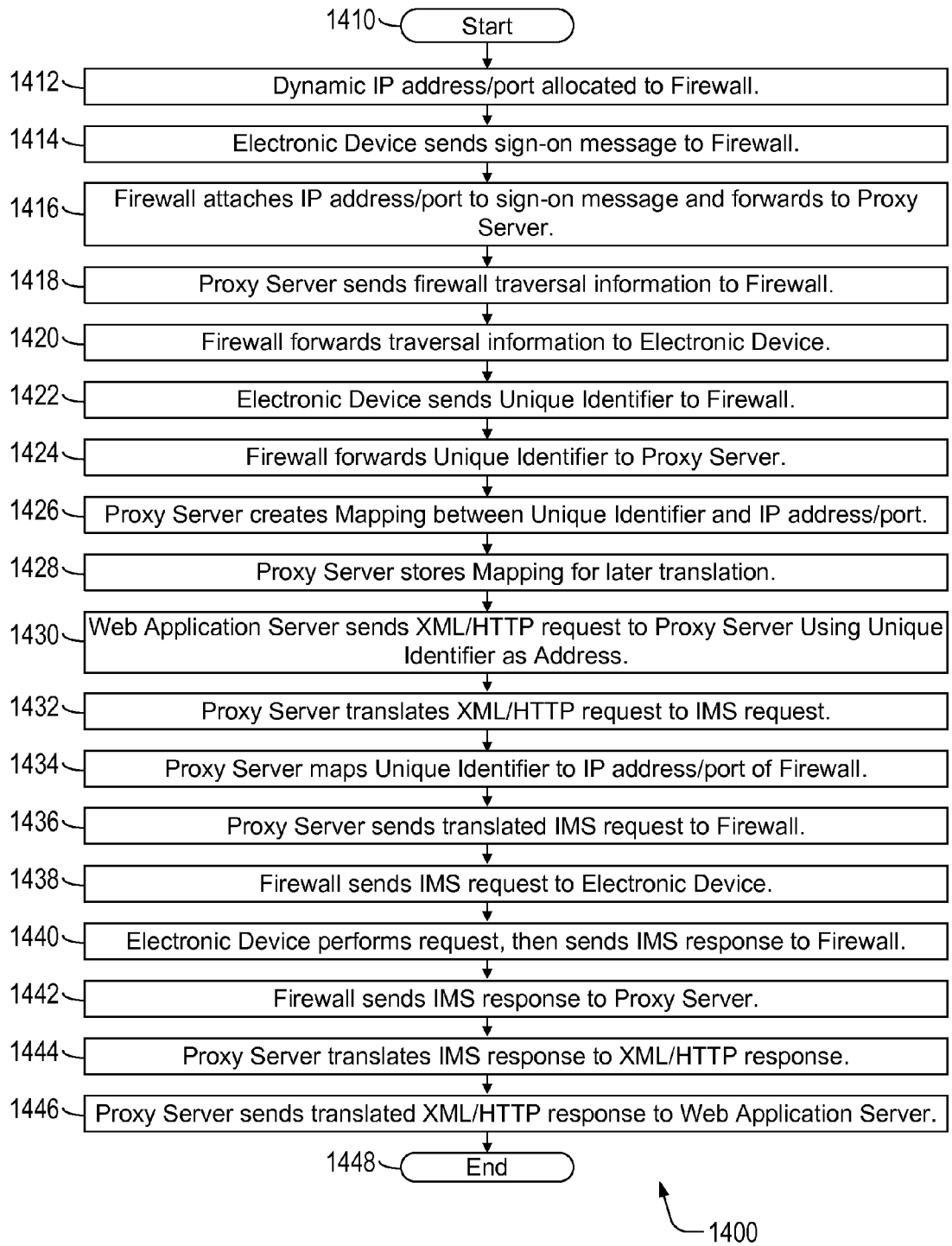
FIG. 14 is an operational flowchart illustrating process steps performed by software functions in accordance with detecting and accessing functions in an internet product system according to an embodiment of the present invention.

FIG. 14 is an operational flowchart illustrating process steps performed by software functions in accordance with detecting one or more internet products 102 by the internet product system 100 and a subsequent accessing or communication dialog between web application server 122 and one or more internet products 102 in an internet product system 100 according to an embodiment 1400 of the present invention. In this embodiment description one or more internet products 102 and gateway 104 (or 104, 116, and 118) are combined into one or more electronic devices ((102, 106, and 104) or (102, 106, 104, 116 and 118)), as would be obvious to one of average skill in the art, to more easily teach the concepts of the invention. It should be noted that, as previously described in detail, the internet product may communicate in CRP within the electronic device which in turn communicates in IMS protocol at other connection points (108, 114, 120, or 126) within wireless internet product system 100. Neither the internet product nor the electronic device communicates directly in web service protocol 128 (XML/HTTP for example). Instead, both the internet product and the electronic device rely on the rest of the invention to provide translation and mapping of the simpler CRP and IMS protocols into web service compatible protocol as outlined below. Also, to more easily convey the concepts of the invention, IMS server 112 and translation server 124 are singly combined into a proxy server (112 and 124).

At the start 1410, a dynamic IP address and port is allocated 1412 to NAT firewall 110. The electronic device sends 1414 a sign-on message to the firewall. The NAT firewall attaches 1416 the IP address and port to the sign-on message and forwards the combined sign-on message to the proxy server. The proxy server sends 1418 a NAT firewall traversal information to the firewall. The NAT firewall forwards 1420 the traversal information to the electronic device. The electronic device sends 1422 a unique identifier to the firewall. The NAT firewall forwards 1424 the unique identifier to the proxy server. This completes the detection phase of the procedure. The proxy server creates 1426 a mapping between the unique identifier and the IP address and port. The proxy server stores 1428 the mapping for later translation enabling internet product system 100 to use the unique identifier as an address throughout the system. The internet product's unique identifier is recognizable even when an internet product's IP address changes for instance if a product is moved from one gateway environment to another or from one NAT firewall to another.

The next phase of the flow chart embodiment 1400 in FIG. 14 shows how web application server 122 accesses the electronic device (and one or more internet products 102 within) in an access or communication dialog. Web application server 122 sends 1430 an web service protocol 128 (XML/HTTP) request to proxy server (112 and 124) using the unique identifier as an address for one of the one or more electronic devices 102 (or one or more internet products 102 within). The proxy server translates 1432 the web service protocol 128 XML/HTTP request to an IMS protocol 108 request. Proxy server (112 and 124) maps 1434 the unique identifier address used by the web application server to the previously stored corresponding IP address and port of NAT firewall 110. The proxy server sends 1436 the translated IMS request to NAT firewall 110. The NAT firewall sends 1438 the IMS request to one of the one or more electronic devices 102. The electronic device (internet product) performs 1440 the request and then sends an IMS protocol 114 or 120 response to the firewall. The NAT firewall sends 1442 IMS protocol 108 response to proxy server 112 and 124. The proxy server translates 1444 the IMS response to web service protocol 128 XML/HTTP response. The proxy server sends 1446 the translated web service protocol XML/HTTP response to web application server 122 completing the accessing or communication dialog phase which ends the entire sequence of steps 1448 of the flow chart embodiment 1400.

Various embodiments using the wireless internet product system 100 are described next. One of these various embodiments of the invention is an internet drawing pad that can be made as a toy for children to create and share drawings and messages over the internet, or as a communication device for adults to send drawings and messages over the internet. One or more internet products 102 are made up of a touch screen display, a microcontroller and the previously described low-power wireless radio. The user of the drawing pad would use her finger tip or a stylus to create drawings and or pictures on the touch-sensitive screen known to those skilled in the art. The location of the pressed stylus or figure is recorded on touch-sensitive sensor layers that overlay the screen. The microcontroller converts the signals from the touch interface to vertical and horizontal coordinates using standard touch screen sensor methods known to those in the art. The horizontal and vertical pixels corresponding to the locations of the pressed screen are then recorded in the writable memory available to the microcontroller and a bit map of the drawing or message is stored in the memory of the drawing pad. The user of the internet drawing pad can then choose to send the drawing to one of several locations where the drawing or message can be viewed. In all cases the message or drawing is sent through wireless internet product system 100.

Drawings or messages can be sent to one or more internet drawing pads though internet product system 100 described above. One method for addressing a drawing pad is to have each pad have a unique serial number assigned to each unit at manufacture. Users can enter the serial number of other pads to which they wish to send drawings or messages on the drawing pad or enter the serial numbers on a web application configuration page associated with the user's drawing pad.

The drawing or message can also be sent to an email gateway where the drawing or message will be attached to an email message and sent to an email address. The drawing or message is passed to an email gateway where the drawing or message will be sent to an email address by web application server 122 that has both an interface to IMS server 112 via the IMS protocol and to an email server to send messages over a protocol such as simple mail transfer protocol (SMTP). An email gateway is a special case of web application server 122 that is connected to translation server 124 via web service protocol 128 interface and has a mail server known to those skilled in the art, for sending and receiving data via email. This email message will have an embedded or attached image of the drawing or message that has been converted to a standard internet format such as graphics interchange format (GIF) or joint photographic experts group (JPEG) format.

The drawing or message can be sent to or from a web application which uses a JAVA® or FLASH® interface to capture a drawing or message made by a user on a web page. The user would make this drawing by drawing with the mouse in a drawing pad web application and, for example, clicking on a send button which passes a message containing the drawing to the IMS server. The message is then sent to an internet pad through internet product system 100. Additionally, drawing or messages can be sent from the internet pad to the web application and displayed to user on a website. In one embodiment the website could be a social networking website such as FACEBOOK® or MYSPACE®. Using the API programming interface for the social networking site, drawings or messages generated from pads could be displayed on the social networking site. Similarly a control could be created to allow the user on the social networking site to create a drawing or message and send it to an internet pad. The social networking application could directly communicate with IMS server 112 using the IMS protocol or the application could use the web service interface available through translation server 124.

The next of these various embodiments of the invention is the embodiment where one or more internet products 102 are a digital camera capable of taking still photos or movies. The camera uses the radio internet system 100. On set up, a user can associate one or more buttons on the camera with email addresses such that, when a photo is taken and an email button is pushed, the image is transferred though gateway 104 (or 104, 116, and 118) and IMS server 112 to web application server 122 with an email interface and sent to the email address corresponding to that button. Pictures or videos can also be passed from the camera to web application server 122. Then, using a web service interface, the pictures or videos can be transferred to a photo printing and/or media fulfillment company, which may create a photo or video product such as a print or DVD, and send the media product to the customer or another address the consumer selects. In one embodiment, the home address of the user is entered on a registration website when the camera is first purchased. When the print button is pressed on the camera, the currently-selected or displayed photo or photos are printed and mailed to the user's home address automatically. In one embodiment, the photo is transferred through the IMS network to an application which transfers the photo via a web service interface to an album on a photo sharing site hosted by a web application server.

The next of these various embodiments of the invention is the embodiment where one or more internet products 102 is a room or house alarm where a motion sensor on the alarm causes the alarm to send a signal to IMS server 112 and to web application server 122 which stores the time of the alarm trigger on an alarm website. The alarm is one or more internet products 102 and is connected to the internet product system 100 described above. In one embodiment, the owner of the alarm is automatically notified via email or short message service (SMS) message of the trigger. In one embodiment, the alarm, when triggered, takes a photo of the person or object that triggered the alarm and sends the digital photo file along with the alarm trigger signal to web application server 122 so that the photo can be displayed on the alarm website to help the user looking at the website understand the nature of the alarm.

The next of these various embodiments of the invention is the embodiment where one or more internet products 102 is a piece of health monitoring equipment such as a blood pressure sensor, blood glucose sensor, pulse oxygen sensor, heart monitor, body temperature sensor, or other medical or health sensor device referred to hereafter as a "medical sensor". The medical sensor has a radio system and is connected as an internet product to wireless internet product system 100 described above. When a user uses the medical sensor to make a measurement, the measurement data is sent through internet product system 100 to web application server 122. The application server can then send the information to a web application that stores the medical data and presents it to the user, a care provider, or a family member through a secure web page hosted by the web application server.

The next of these various embodiments of the invention is the embodiment where one or more internet products 102 is a piece of exercise or weight training equipment such as a treadmill, elliptical trainer, stationary bike, weight training machine, or other exercise device referred to hereafter as "exercise equipment". The exercise equipment is one or more internet product 102 and therefore has a radio system and is connected to wireless internet product system 100 described above. When a user uses the exercise equipment, exercise data such as time spent exercising, calories burned, miles covered, difficulty settings, pace, and other relevant exercise information is sent through internet product system 100 to translation server 124 which then sends the information on to a web application on web application server 122 that stores the exercise data and presents it to the user or the users trainer through a web page. The exercise web page can also be used to design exercise programs that can then be sent through the internet product system 100 to the exercise equipment. Exercise programs can contain information such as the duration of the session, difficulty settings, changing profiles of difficulty and pace over the time of the workout, and other relevant parameters. If the exercise equipment is used by more than one person, the user would authenticate when she first starts using the exercise equipment by entering a pin number, swiping a magnetic card, using a radio frequency identification (RFID) device, inserting a USB device that contains authentication, or by using some other authentication method known in the art. Once the user is authenticated, the current exercise program is downloaded or a pre-downloaded exercise program is loaded for the user. Also, exercise data can be uploaded and associated with the correct user after authentication has taken place.

The next of these various embodiments of the invention is the embodiment where one or more internet product 102 is a thermostat for residential or commercial buildings. The thermostat installs as a standard programmable thermostat and replaces the user's existing thermostat if one is present. The thermostat is one or more internet product 102 and therefore has the radio described above, and is connected to wireless internet product system 100. In one embodiment of the thermostat, the user registers the thermostat on a product registration website, entering in key characteristic data for the house or commercial building that the thermostat is to control. For example, such data could be the type, age and model numbers of the heater and air conditioner for the building, the input capacity of the heater and air conditioner, the zip code for the building location, the age of the building and the HVAC system, the efficiency of the heater and air conditioner, the square footage or cubic footage of the building, the type of construction, the number of windows, and/or any other data relevant to the heating or cooling of the building. At registration, the user also chooses a username and a password which set up a thermostat web application account.

Web application server 122 delivers web pages to the user which provide information and statistics gathered from the thermostat and allow the user to control thermostat settings such as the standard settings for a 7-day programmable thermostat, known in the art. The thermostat web application sends data to and collects data from the thermostat through web service protocol 128 interface on translation server 124.

The web application is connected to internet data sources for weather information based on zip code, and sends outside temperature and weather forecast information, including cloud cover, rain, high and low temperatures for the day to the thermostat to the thermostat for display.

All thermostat settings and thermostat temperature and time program settings can be controlled though the web interface, allowing control of the thermostat from any internet enabled computer or device with a web browser and an internet connection.

The thermostat can also be controlled by a utility company or other authorized third party using the web service interface on the application server or web application server 122. Example uses include turning off the heater or air conditioner or temporarily change the thermostat setting to reduce the energy demands the heating ventilation air conditioning (HVAC) system is imposing on the utility company's energy infrastructure. The thermostat and thermostat web site can display if the user is enrolled in this energy demand response system and whether the system is actively limiting HVAC energy usage. The thermostat and thermostat website can also provide information on the bonus accumulated by the user for her participation in the demand response system.

To determine the efficiency of the house, an estimate of the insulating efficiency of the house can be determined by raising the temperature of the house above the outside air temperature. The outside air temperature can be estimated since the user entered her city or zip code for the house when the thermostat was registered on the web page. The temperature for the zip code or city is obtain through web service interfaces known to those in the art, and then is sent from the thermostat web application server 122 to the thermostat through the wireless internet product system 100. Once the temperature is above the estimated outside air temperature, the heater is turned off and the decay of the inside temperature is measured. Using the square footage measurement and other structure data entered by the user, and the rate of loss of heat as compared the size and characteristics of the structure, an estimate of heating or cooling loss can be recorded and presented to the user to provide information about how efficient the structure is.

The thermostat system also records how changes in the inside temperature setting selected on the thermostat affect the number of minutes per day that the heater or air conditioner must run to keep the structure at the set temperature. Once the number of minutes the heater must run is known, estimates of the cost of gas or electricity can obtained from regional averages or from pricing data from the users utility. In some cases the pricing data will be automatically obtained from government utility, or third party provider servers though the web service interface. Using the input energy capacity estimate, the total time the heater or air conditioner operated, and the cost of energy such as gas or electricity purchased from the user's utility company, a total cost estimate to heat and cool the structure can be obtained. Note that if the user's utility uses time of day pricing to compute the energy bill, the internet thermostat system will also record the time of day of each heating or cooling cycle in order to compute to total cost correctly.

The thermostat web application can also collect temperature history and temperature projections for the zip code, city, or address the user enters at registration time.

The internet thermostat system combines the structure data and temperature history to determine the estimated cost for heating and cooling the house in the future for a given set of temperature settings and program times. This allows the user to make "what-if" changes to her temperature settings and or thermostat program to see the estimated cost or savings of such a change over a time period of her choosing, for example one year. This estimate can be computed by the internet thermostat system in real time and displayed both on the thermostat website and on the display of the thermostat itself.

As the user changes the thermostat setting or changes the thermostat program, the thermostat calculates and totals the cost expense for the next day, week, month and year and presents them the user to help her evaluate the cost associated with energy choices. The difference in cost from the previous thermostat setting is also presented to help the user understand a cost or benefit projection due to her change in the thermostat temperature setting or thermostat program.

The next of these various embodiments of the invention is a small internet information display device which consists of a low-cost display containing the radio system, a microcontroller, an LCD controller, and driver hardware and software for controlling the display and processing input familiar to those skilled in the art. The internet information device is one or more internet product 102 and connects to wireless internet product system 100 described above. Information such as current and forecasted weather, stock and index prices, traffic maps with congestion illustrations, and/or movie ratings and times are gathered by a web application and sent to the application server to be distributed to the internet information display device.

In one embodiment of the internet information display device, the user registers the device on a product registration website entering in the key data characteristics for the use of the device such as the user's zip code, work commute destination, email server settings, account and login information for social networking sites such as FACEBOOK®, and instant messaging service such as AIM®, YAHOO®

INSTANT MESSENGER® or MICROSOFT® MESSENGER®, etc. At registration the user also chooses a username and a password, which sets up a website account on web application server 122. The web application server hosts web pages that the user uses to change which information will be downloaded and displayed on his internet information display device.

The information device will then display the information types selected by the user on the display. In one embodiment, this information is constantly displayed on the screen. If there is more information than one screen can display, the device will display each screen for short period of time before changing to the next screen of information, freeing the user from having to touch buttons on the display to retrieve information. This makes the information display useful if the user looks at it from a distance, as no buttons will need to be pressed, which improves ease of use for the device.

In one embodiment, the user enters on the website associated with the display device, various alternative routes used in his commute. The web application uses web service interfaces to other web servers and web applications to get an estimated trip time for each possible route, factoring in the effects of current traffic congestion along with an optional shortest-time-route that may or may not have been entered by the user. The travel time for these routes is computed by the web application using the normal methods familiar to those in the art, and the travel times are transmitted through wireless internet product system 100 described above and displayed on the internet information device. The user can quickly glance at the device and see the current travel times for different routes to one or more chosen locations and pick the quickest route based on current conditions. To make the device useful for locations that are not preselected by the user, a map of the major roads and freeways indicating real-time congestion levels can also be displayed on the information device. The user's zip code and other location information are used to determine which maps should be sent to the information display device.

In one embodiment, web application server 122 queries the instant messaging and social networking sites using the account information provided by the user on the internet information device configuration web page. The web application then collects information from the instant messaging service such as which friends are currently online and sends this information to the internet display device to be displayed. The advantage the device provides is that the user only needs to look briefly at this device to determine if friends are online and ready to communicate instead of using a computer, personal digital assistant (PDA), or other multi-purpose device the requires more operational overhead.

In one embodiment, applications are written for a social networking site such as FACEBOOK® so that messages can be written from a user's home page on the social networking site and then passed to web application server 122 to be displayed on the user's internet information device.

In one embodiment, the internet display device is used as a client for a micro-blogging service such as TWITTER®. The web application server 122 or web application uses the web service API to send and receive messages between the micro blogging service and the web application server or web application. The web application server provides a configuration web page for the user to select micro bloggers and/or automated information postings such as weather and stock information that will then be automatically sent from the micro blogging server to the web application server which implements the micro blogging service API to send and receive messages. The messages are then transmitted to the internet information display device through wireless internet product system 100.

In one embodiment, web application server 122 queries the user's email system using the account information provided by the user on the internet device configuration web page. The web application then collects email subject, sender, and partial first email body text from the user's email service and sends this information to the internet information display device to be displayed. The advantage of using the internet device for this purpose as opposed to a full email client is that the user only needs to look briefly at this device to determine if an important email has arrived and he needs to start his computer to deal with it.

In one embodiment, the internet display device web application server 122 takes information feeds such as an really simple syndication (RSS) feed and/or updates on friends' pages on a social networking site, sends this information through internet product system 100, and displays the news feed information on the LCD display.

The next of these various embodiments of the invention is the embodiment where one or more internet product 102 is an animatronic toy such as a toy robot, animatronic character, or animatronic pet such as a dog, cat, or other animal. The animatronic toy has motor controls to move or gesture and may also have the ability to make sounds or play sound files. Some of these toys will have the ability to play sound files such as stories and coordinate animatronic movements to create the illusion that the animatronic toy is a talking, as the toy moves and changes expression though animatronic movements of eyes, mouth, eye brows, ears, head, tail, hands and/or feet. The animatronic toy is an one or more internet product 102, has the radio previously described above, and is connected to wireless internet product system 100.

A web application hosted on the web application server 122 for the animatronic toy is created that has the following features. The web application has a depiction of the animatronic toy which, in this embodiment, is built using FLASH®. When the user interacts with the FLASH® depiction, command signals are sent to the animatronic toy which cause movement, actions, and sounds in response to actions taken by the user on the web application. As an example, the animatronic toy can be remotely controlled by the user by dragging its hands and feet with the mouse, which triggers physical movement of the hands and feet, and other items in the animatronic toy.

There are also sensors for sound, light, and position for the animatronics that allow activity or movement of the animatronic toy to be sensed and transmitted through the wireless internet product system 100 to the web application and trigger changes in the depiction of the animatronic toy on the web page.

Similarly, web games can be played where, during the game, signals are sent to and received from the animatronic toy to provide information to the web game and affect the web game outcome. In this way the animatronic toy becomes an input and output device for the web game. In one embodiment, the animatronic toy can be used to interact with online virtual words. For example, success in the activities and games in an online world leads to signals being sent down to the animatronic toy to unlock new capabilities such as the animatronic toy being able to be used to detect a sound in your room, sound an alarm, and sent a signal that will be recorded by the web application.

In one embodiment, the animatronic toy senses that it is being played with through accelerometer sensors, motion sensors, sound sensors, and proximity sensors, and sends this activity information to the web game or virtual world, where the user is rewarded for the play time with online bonuses. Bonus can be used as online currency to purchase virtual items, virtual real-estate, or abilities in the virtual world.

In one embodiment, data from the motion sensors of one animatronic toy can be sent through internet product system 100 to another animatronic toy. When a user moves the motor and sensor-enabled parts on the animatronic toy, another animatronic toy linked to the first toy moves to mimic the positions of the first toy. Both animatronics toys need only be connected to internet product system 100. They can be controlled over distance this way with one toy being the controller and the second toy being controlled by the movements of the first toy.

The next of these various embodiments of the invention is the embodiment where one or more internet product 102 is a handheld or table-top game such as an electronic version of a game TV show, chess, checkers, poker, blackjack, craps or other such games. The game is an internet product 100 and therefore includes the radio system described above and is connected to the wireless internet product system 100 described above. The game allows the user to connect to one or more users with compatible devices or compatible web applications on web browsers to play a game. The user can select an unknown player of a similar skill level as computed by win/lose record, or may select a friend's screen name to indicate what opponent she would like to play against. The game internet product system is also connected to a game web application that provides a way for users to play games with other users though any web browser since the web application provides a JAVA® or FLASH® representation of the game that send the same movement and commands as the internet product game and therefore any combination of web browser or internet product players may play each other.

In one embodiment, when the user creates a high score on the game the high score is transmitted to all game devices or a subset of the game devices connected to wireless internet product system 100 so that all users will see the name or initials of a new top player along with the player's high score.

In one embodiment new game play content such as questions, topical trivia, sports statistics and other fresh content are downloaded to the games through wireless internet product system 100.

For all the above applications, content can be downloaded from web application server 122 to one or more internet product 102 without requiring any intervention from the user as the low power radio subsystem can remain on and always connected and therefore always ready to receive new content even when the internet product is in the off mode since this off mode does not turn off the radio subsystem. This always-on connection even when the internet product is nominally off is possible because of the low power requirements of the radio hardware and CRP protocols.

Foregoing descriptions of specific embodiments of the invention have been presented for purposes of illustration and description. They are not intended to be exhaustive or to limit the invention to the precise forms disclosed. Modifications and variations are possible in light of the above teaching. For example, applicant contemplates that present invention may be applied for various purposes, such as economizing use and optimizing storage of fossil fuels or other non-fossil energy conservation, as well as bioinformatic/biohazard or other remote sensor application for homeland security and defense or anti-terrorist surveillance or control functions.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

We claim:

1. In a network providing an internet coupled to a web application server with an internet address using a web service protocol, a proxy server coupled to said web application server, and a firewall coupled to said proxy server, a network communication system comprising:
    a one or more electronic devices coupled to said firewall, wherein each of said one or more electronic devices is further comprising a processor, a storage, and a communication circuit;
    a unique identifier stored in each of said one or more electronic devices, said unique identifier corresponding to said one or more electronic devices;
    a first program executable by at least one of said one or more electronic devices, is configured to cause said electronic device to transfer their said unique identifier through said firewall, said transfer using an internet message system (IMS) protocol, and wherein said IMS protocol comprises an IMS packet, and said IMS packet comprises an IMS packet length and said unique identifier, wherein said IMS packet length is shorter than a web service protocol packet length having corresponding information content; and,
    a second program executable by said proxy server further comprising a routing program and a translating program, wherein said transfer of said unique identifier by said first program is between said one or more electronic devices and said proxy server, wherein said routing program based on said unique identifier routes said IMS packet to one or more of said electronic devices or to a destination indicated by said internet address using said web service protocol and routes said IMS packet through said translating program, and said translating program translates said IMS protocol to and from said web service protocol, wherein the internet address using the web service protocol communicates information, content, or commands to one of the one or more electronic devices.

2. The system of claim 1 wherein one of said one or more electronic devices comprises:
    a gateway comprising a processor, a memory, and a low power wireless circuit; and,
    a one or more internet products each further comprising a processor, a memory, and a low power wireless circuit, wherein said gateway is coupled to said firewall, and said gateway is coupled to said one or more internet products through a compact radio protocol (CRP) to communicate through respective of said low power wireless circuits, wherein said CRP comprises a CRP packet, wherein said CRP packet comprises a plurality of CRP fields and a CRP packet length that is shorter than said IMS packet length having corresponding information content, wherein said IMS packet comprises a plurality of IMS fields and said CRP packet has fewer of said plurality of CRP fields than said plurality of IMS fields having corresponding information content, wherein said CRP comprises said unique identifier and said unique identifier corresponds to said one or more internet products, wherein said first program executable by said gateway translates said CRP to and from said IMS protocol, and wherein said routing program routes said IMS packet to said one or more internet products or to a destination indicated by said internet address using said web service protocol, wherein the internet address using the web service protocol communicates information, content, or commands to one of the one or more internet products.

3. The system of claim 2 wherein said gateway stores an IMS packet sent to one of said one or more internet products or said gateway stores a CRP packet translation of said IMS packet sent to one of said one or more internet products, wherein one of said one or more internet products periodically wakes up from a low power sleep mode and sends a CRP packet to said gateway, whereupon said gateway sends to one of said one or more internet products said CRP packet translation of said IMS packet sent to one of said one or more internet products previously stored, wherein one of said one or more internet products enters a low power mode between said periodic sending thereby reducing power consumption in one of said one or more internet products.

4. The system of claim 2 wherein said low power wireless circuit comprises a received signal strength circuit wherein said received signal strength circuit is configured to determine a predetermined reduced signal strength condition which initiates a resynchronization scan to said gateway.

5. The system of claim 1 wherein said electronic device comprises:
a dongle comprising a low power wireless circuit for coupling to a personal computer coupled to said firewall; and,
a one or more internet products each further comprising a processor, a memory, and a low power wireless circuit, wherein said dongle is coupled to said one or more internet products through a compact radio protocol (CRP) to communicate through respective of said low power wireless circuits, wherein said CRP comprises a CRP packet, said CRP packet comprises a plurality of CRP fields and a CRP packet length that is shorter than said IMS packet length having corresponding information content, wherein said IMS packet comprises a plurality of IMS fields and said CRP packet has fewer of said plurality of CRP fields than said plurality of IMS fields having corresponding information content, wherein said CRP comprises said unique identifier and said unique identifier corresponds to said one or more internet products, wherein said first program executable by said personal computer translates said CRP to and from said IMS protocol, and wherein said routing program routes said IMS packet to one of said one or more internet products or to a destination indicated by said internet address using said web service protocol, wherein the internet address using the web service protocol communicates information, content, or commands to one of the one or more internet products.

6. The system of claim 5 wherein said personal computer stores an IMS packet sent to one of said one or more internet products or said personal computer stores a CRP packet translation of said IMS packet sent to one of said one or more internet products, wherein one of said one or more internet products periodically wakes up from a low power sleep mode and sends a CRP packet to said personal computer, whereupon said personal computer sends to one of said one or more internet products said CRP packet translation of said IMS packet sent to one of said one or more internet products previously stored, wherein one of said one or more internet products enters a low power mode between said periodic sending thereby reducing power consumption in one of said one or more internet products.

7. The system of claim 1 wherein said firewall comprises a table entry, wherein said table entry permits said second program to cause the proxy server to transfer said IMS packet through said firewall to one of said one or more electronic devices, said table entry having a timeout time which blocks said transfer, wherein said first program or said second program determine an approximation of said timeout of said table entry based upon a succession of said IMS packets sent to said firewall from one of said one or more electronic devices or from said proxy server with varying times between said IMS packets sent and based upon recording when said IMS packet fails to transfer through said firewall successfully, wherein said approximation of said timeout time is stored in one of said one or more electronic devices and used to send said IMS packet periodically to said firewall based on said approximation of said timeout time, wherein said timeout of said table entry is prevented, thereby permitting a communication routed from said second program to one of said one or more electronic devices with reduced communication system overhead.

8. The system of claim 1 wherein said system comprises an application state or key value pair message associated with one of said one or more electronic devices, wherein said second program stores said application state or key value pair message.

9. The system of claim 1 wherein said IMS packet length comprises fewer than five hundred bytes.

10. The system of claim 1 further comprising:
an IMS server coupled to said firewall; and
a translation server having a first connection coupled to said IMS server and a second connection coupled to said web application server,
wherein said routing program is executable by said IMS server, and said translating program is executable by said translation server.

11. The system of claim 1 wherein one of said one or more electronic devices comprises a thermostat further comprising encoded instructions that cause the thermostat to store a control setting sent by said internet address using said web service protocol, sending a data to a destination indicated by said internet address using said web service protocol, and respond to said internet address using said web service protocol.

12. The system of claim 1 wherein one of said one or more electronic devices comprises an animatronic toy comprising a motor causing motion or character gesturing in said animatronic toy and a control circuit actuating said motor, and said control circuit being responsive to said internet address using said web service protocol.

13. The system of claim 12 wherein said animatronic toy further comprises a sensor responsive to motion or environment of said animatronic toy, said animatronic toy configures to send a data from said sensor to a destination indicated by said internet address using said web service protocol or to another one of said one or more electronic devices and said another one of said one or more electronic devices being responsive to said animatronic toy.

14. The system of claim 1 wherein one of said one or more electronic devices comprises a toy comprising an ability to make a sound or play a sound file, wherein said ability being responsive to said internet address using said web service protocol.

15. The system of claim 14 wherein said toy further comprises a sensor responsive to motion or environment of said toy, said toy is configured to send a data from said sensor to a destination indicated by said internet address using said web service protocol or to another one of said one or more electronic devices and said another one of said one or more electronic devices being responsive to said toy.

16. The system of claim 14 wherein said toy is configured to make a sound or play a sound file and receive said sound or said sound file from said internet address using said web service protocol, wherein said ability being responsive to said internet address using said web service protocol.

17. The system of claim 1 wherein one of said one or more electronic devices comprises a medical sensor, wherein said medical sensor is configured to send a data to a destination indicated by said internet address using said web service protocol.

18. The system of claim 1 wherein one of said one or more electronic devices comprises a touch screen display drawing pad, wherein said touch screen display drawing pad is configured to send a data to a destination indicated by said internet address using said web service protocol or to another touch screen display drawing pad.

19. The system of claim 1 wherein one of said one or more electronic devices comprises a sensor, wherein said sensor is configured to send a data to a destination indicated by said internet address using said web service protocol.

20. The system of claim 1 wherein one of said one or more electronic devices comprises a toy comprising a sensor, wherein said sensor is configured to send a data to a destination indicated by said internet address using said web service protocol.

21. In a network providing an internet coupled to a web application server with an internet address using a web service protocol, a proxy server coupled to said web application server, a firewall with network address translation coupled to said proxy server, a network communication system comprising:

- a one or more internet products each further comprising a microcontroller, a memory, and a low power wireless circuit;
- a unique identifier stored in each of said one or more internet products, said unique identifier corresponding to said one or more internet products;
- a gateway comprising a microcontroller, a memory, and a low power wireless circuit, wherein said gateway is coupled by a local area network (LAN) connection to said firewall with network address translation and wherein said gateway is coupled to said one or more internet products through a compact radio protocol (CRP) to communicate through respective of said low power wireless circuits, wherein said CRP comprises a CRP packet, wherein said CRP packet comprises a plurality of CRP fields and a CRP packet length, wherein one of said plurality of CRP fields comprises a CRP address field comprising said unique identifier;
- a first program executable by said gateway translates said CRP to and from an internet message system (IMS) protocol and, is configured to cause said electronic device to transfer their said unique identifier through said firewall with network address translation, said transfer using said IMS protocol that is permitted to pass through said firewall with network address translation, and wherein said IMS protocol comprises an IMS packet, and said IMS packet comprises an IMS packet length, a plurality of IMS fields, an internet protocol (IP) header, wherein said CRP packet length is shorter than said IMS packet length having corresponding information content and said CRP packet has fewer of said plurality of CRP fields than said plurality of IMS fields having corresponding information content, wherein said IMS packet length is shorter than a web service protocol packet length having corresponding information content;
- a routing program executable by said proxy server, wherein said transfer of said unique identifier by said first program is between one of said one or more internet products and said routing program; and,
- a translating program executable by said proxy server, wherein said translating program translates said IMS protocol to and from said web service protocol, wherein said routing program based on said unique identifier routes said IMS packet to said gateway which translates said IMS packet to said CRP packet and passes said CRP packet to one or more of said internet products, or routes said IMS packet to a destination indicated by said internet address using said web service protocol and routes said IMS packet through said translating program, wherein the internet address using the web service protocol communicates information, content, or commands to one or more of the internet products.

* * * * *